United States Patent
Cartigny et al.

(10) Patent No.: US 11,805,240 B2
(45) Date of Patent: Oct. 31, 2023

(54) METHOD FOR MODIFYING MULTIMEDIA CONTENT

(71) Applicant: Orange, Issy-les-Moulineaux (FR)

(72) Inventors: Jean Cartigny, Chatillon (FR); Cedric Floury, Chatillon (FR)

(73) Assignee: ORANGE, Issy-les-Moulineaux (FR)

(*) Notice: Subject to any disclaimer, the term of this patent is extended or adjusted under 35 U.S.C. 154(b) by 105 days.

(21) Appl. No.: 17/599,109

(22) PCT Filed: Mar. 27, 2020

(86) PCT No.: PCT/EP2020/058837
§ 371 (c)(1),
(2) Date: Sep. 28, 2021

(87) PCT Pub. No.: WO2020/201148
PCT Pub. Date: Oct. 8, 2020

(65) Prior Publication Data
US 2022/0174266 A1    Jun. 2, 2022

(30) Foreign Application Priority Data
Mar. 29, 2019    (FR) ...................................... 1903398

(51) Int. Cl.
*H04L 65/403*    (2022.01)
*H04N 17/00*    (2006.01)
(Continued)

(52) U.S. Cl.
CPC ............. *H04N 17/00* (2013.01); *G06T 5/001* (2013.01); *G06T 7/0002* (2013.01);
(Continued)

(58) Field of Classification Search
CPC ..... H04L 65/403; H04L 65/765; H04L 65/80; G06T 5/001; G06T 7/0002;
(Continued)

(56) References Cited

U.S. PATENT DOCUMENTS 9,686,510 B1 * 6/2017 Riley .................. G06F 3/04842
2005/0213805 A1 * 9/2005 Blake .................. G06V 10/993
382/137
(Continued)

FOREIGN PATENT DOCUMENTS

WO    WO-2015088407 A1 * 6/2015 ......... H04L 12/1822

OTHER PUBLICATIONS

International Search Report dated Apr. 8, 2020 for corresponding International Application No. PCT/EP2020/058837, filed Mar. 27, 2020.
(Continued)

*Primary Examiner* — Melur Ramakrishnaiah
(74) *Attorney, Agent, or Firm* — David D. Brush; Westman, Champlin & Koehler, P.A.

(57) ABSTRACT

A method for modifying multimedia content captured by at least one first terminal which is capable of re-transmitting the content. The method includes identifying at least one part of the content captured by the at least one first terminal, determining, for the at least one part, at least one quality indicator and modifying the at least one part of the content depending on the at least one quality indicator.

14 Claims, 2 Drawing Sheets

Figure 1:
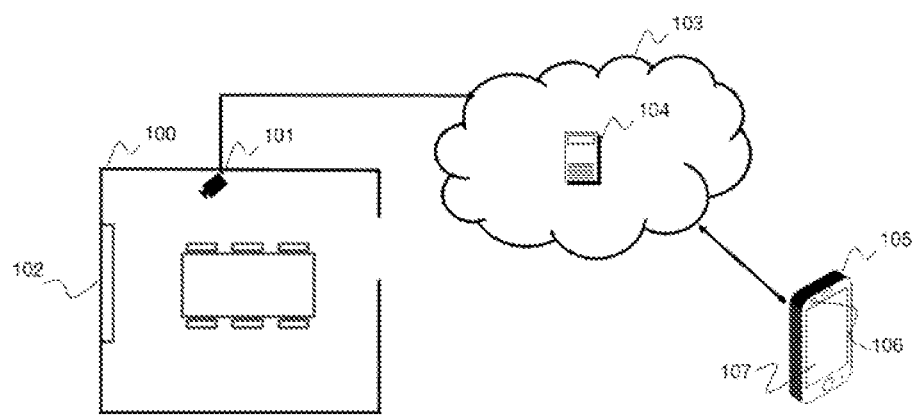

(51) Int. Cl.
*G06T 5/00* (2006.01)
*G06T 7/00* (2017.01)
(52) U.S. Cl.
CPC .. *H04L 65/403* (2013.01); *G06T 2207/10016* (2013.01); *G06T 2207/30168* (2013.01)
(58) Field of Classification Search
CPC G06T 2207/30168; G06T 2207/10016; H04N 7/147; H04N 17/00
USPC .......................................... 348/14.01–14.16
See application file for complete search history.

(56) References Cited

U.S. PATENT DOCUMENTS

| | | | |
|---|---|---|---|
| 2012/0221639 A1* | 8/2012 | Mallet ..................... | H04L 67/06 709/204 |
| 2015/0145944 A1 | 5/2015 | Stonefield et al. | |
| 2015/0195491 A1* | 7/2015 | Shaburov ............... | H04N 7/147 348/14.12 |
| 2016/0308929 A1 | 10/2016 | Fu et al. | |

OTHER PUBLICATIONS

Written Opinion of the International Searching Authority dated Apr. 8, 2020 for corresponding International Application No. PCT/EP2020/058837, filed Mar. 27, 2020.

English translation of the Written Opinion of the International Searching Authority dated Apr. 21, 2020 for corresponding International Application No. PCT/EP2020/058837, filed Mar. 27, 2020.

\* cited by examiner

US 11,805,240 B2

METHOD FOR MODIFYING MULTIMEDIA CONTENT

CROSS-REFERENCE TO RELATED APPLICATIONS

This Application is a Section 371 National Stage Application of International Application No. PCT/EP2020/058837, filed Mar. 27, 2020, which is incorporated by reference in its entirety and published as WO 2020/201148 A1 on Oct. 8, 2020, not in English.

1. FIELD OF THE INVENTION

The invention relates to the field of digital content, and more particularly to a method for modifying a portion of an item of content displayed by a device able to render said item of content, such as a mobile terminal or a television.

2. PRIOR ART

Nowadays, a large number of business meetings are held remotely. This allows for example a company to reduce its carbon footprint by limiting the travel of its colleagues. Thanks to the growth of telecommunications networks, these meetings have evolved considerably, moving from simple telephone meetings to videoconferencing meetings allowing people to see and dialog with their contact partners. To conduct these videoconferences, dedicated rooms with cameras, screens and Internet connectivity are more often than not set up on companies' premises. These are however limited in terms of numbers because they are very expensive to implement. It is thus not uncommon for some colleagues to use a terminal such as for example a smartphone, a tablet or a computer to participate in these videoconferences. These people are then more often than not located within a common workspace, such as a shared office.

During these videoconferences, participants have the opportunity to share multimedia content (presentations, videos, etc.). For participants located for example remotely, the quality of the rendering of this content on the screen of their terminal then depends on multiple factors, such as the quality of the video capturing, which is itself linked to the capabilities of the video-capturing hardware present in the videoconference room, the encoding quality of the video stream, the capabilities (available processor power/memory/video encoder/decoder, etc.) of their terminal or else the quality of the communication network used to channel information. When a presentation in text format is shared, these same participants will find it difficult to read the item of content on their terminal if the conditions outlined above are not all met. They will then be deprived of the medium for the discussion. This problem is also applicable for participants located in the room if said room is large enough, such as for example a conference room or an amphitheater. Participants far away from the screen or who have visual impairments will naturally wish to use their mobile terminal to view the shared item of content, and will be faced with the same limitations. All this may pose problems with regard to understanding and, as a result, with regard to the effectiveness of the meeting.

Conversely, if all of the conditions allowing a high-quality content broadcast are met, it is possible for people sharing the video stream captured by the camera of their mobile terminal to unknowingly or unwittingly reveal sensitive data displayed for example on a screen located in the capturing field of the camera of the mobile terminal.

3. DISCLOSURE OF THE INVENTION

No solution is currently offered by videoconferencing tools for enriching the video stream with an item of content having better quality and/or for masking content that may pose confidentiality problems. The invention aims to improve the prior art by proposing, to this end, a method for modifying an item of multimedia content captured by at least one first terminal able to retransmit said item of content over a communication network, characterized in that the method comprises:
 a step of identifying at least one portion of said item of content captured by said at least one first terminal,
 a step of determining at least one quality indicator for said at least one portion,
 a step of modifying said at least one portion of said item of content on the basis of said at least one quality indicator.

Advantageously, according to the invention, such a method allows a user using for example the camera of his mobile terminal to conduct a videoconference to protect himself from disclosing confidential information. Indeed, if a quality indicator associated with a portion of the item of multimedia content indicates that it is for example possible to clearly read a text that is not present in an item of reference content, such as a shared presentation, the method will then mask the text. The masking may be performed by substituting the identified portion with an item of neutral content, such as a predefined item of multimedia content, such as for example the audiovisual identity of the company. The user thus controls the information retransmitted by the camera and is certain that all of the elements captured in an environment not designed for a videoconference will be processed and censored if necessary.

Otherwise, if the user wishes to ensure that a presentation shared during a videoconference will be clearly legible, the method will check that this will actually be the case using a quality indicator determined on the identified portion of the item of multimedia content corresponding to the displayed area of the shared presentation. If the quality indicator reveals that the identified portion of the item of content does not have the required quality level, the method will then advantageously modify it by replacing its content with the corresponding item of reference content. The item of reference content has for example sufficient quality for the quality indicator to indicate that the new content present in the identified portion will be legible.

"Item of reference content" is understood here to mean all documents and audiovisual media shared during the videoconference (video, audio, text, images, etc.), but also any type of content that makes it possible to evaluate, through comparison, the quality of the item of multimedia content, such as for example an image/sound database, an alphabet or even a dictionary. A terminal is understood here to mean any device able to capture an item of multimedia content and to connect to a communication network, such as a connected camera, a computer or even a smartphone. It should be noted that the capturing performed by the one or more first terminals may, in addition to the broadcasting of the captured item of multimedia content, involve a recording step prior to the broadcasting, without however departing from the scope of the invention. It will also be noted that the communication network may be limited, without departing from the context of the invention, to a point-to-point connection, such as for example a connection using WiFi Direct technology.

According to one particular mode of implementation of the invention, a method as described above is characterized in that the modification step is followed by a step of transmitting the modified item of multimedia content to at least one second terminal. This mode of implementation of the invention makes it possible for example to broadcast the modified item of content to terminals connected to the videoconference and located remotely.

According to one particular mode of implementation of the invention, a method as described above is characterized in that said portion of the item of multimedia content contains an image or a sequence of images.

Advantageously, the evaluation of the quality of the content, such as images or sequences of images, is known to those skilled in the art. The method will then identify, for example using AI (Artificial Intelligence) trained to locate particular elements in an image or a sequence of images, a portion of the item of multimedia content and determine an associated quality indicator. Depending on the indicator, the method will then advantageously modify the identified portion with an item of content having the required quality.

According to one variant of this particular embodiment of the invention, a method as described above is characterized in that the modification of said at least one portion is an enrichment with an image or a sequence of images having said at least one quality indicator higher than the one determined for said at least one portion. It is thereby then possible for a user to view the item of content with an improved image quality. There are numerous methods for evaluating the quality of an image, with or without a reference.

According to one variant of this particular embodiment of the invention, a method as described above is characterized in that the modification of said at least one portion is an enrichment with an image or a sequence of images having said at least one quality indicator lower than the one determined for said at least one portion. Confidential elements present in the item of multimedia content captured by a terminal present in the videoconference room may thereby be worsened so as to render them unintelligible, or even completely masked.

According to one particular mode of implementation of the invention, a method as described above is characterized in that said portion of the item of multimedia content contains a pre-recorded audio sequence. During the videoconference, users may wish to broadcast a pre-recorded audio sequence. The method will then identify, for example using the audio track, that portion of the item of content that is associated with the audio sequence, and determine a quality indicator. Depending on the indicator, the method will then advantageously modify the identified portion with an item of audio content having the required quality.

According to one particular mode of implementation of the invention, a method as described above is characterized in that said at least one quality indicator for the content of said at least one portion is obtained at the end of the following steps:
obtaining an item of reference content,
comparing said item of reference content and the content of said at least one portion of said item of multimedia content captured by said at least one first terminal.

This embodiment makes it possible to ensure an increased quality of the result of the method, with certainty that the content of the portion selected and processed by the method will be very close to the item of reference content. The comparison will then be faster and will make it possible to have a more reliable quality indicator. Indeed, in the case of a textual item of multimedia content, it will then not be necessary for the method for modifying an item of multimedia content to know the alphabet or the complete dictionary of the language used to determine the quality indicator. It will be enough for example for it to compare the letters or the words present in the item of reference content with the letters or words present in the portion of the item of multimedia content selected by the method.

According to one variant of this particular embodiment of the invention, the method as described above is characterized in that the item of reference content is obtained from a database. The item of reference content used by the method to determine a quality indicator for a portion of the item of multimedia content may thereby be modified before the method is executed. Indeed, it is then possible to make modifications to the item of reference content until the method is executed, making it possible to obtain an acceptable quality indicator so as to limit the modifications to be made to the item of multimedia content.

According to one particular mode of implementation of the invention, a method as described above is characterized in that said at least one quality indicator depends on the hardware or software capabilities of said at least one first terminal. Indeed, if the hardware or software capabilities of the terminals connected to the videoconference are known to the method and they indicate that the video-capturing quality of the terminal being used will not be sufficient to render the item of reference content with the required quality, then the selected portion may be modified systematically.

According to one particular mode of implementation of the invention, a method as described above is characterized in that said at least one quality indicator depends on the quality of the communication network that is used. This quality may for example be linked to the bandwidth available at a given time in the communication network. Regular measurement will make it possible to ensure that the communication network does not intervene in the worsening of the item of multimedia content broadcast by the terminal.

According to another particular embodiment of the invention, a method as described above is characterized in that said at least one quality indicator for the content of said at least one portion is compared with at least one predetermined threshold value for the quality level. A threshold value is understood here to mean a reference value of a quality indicator to be complied with for a portion of the item of multimedia content. Advantageously, this mode of implementation of the invention makes it possible to manage the sensitivity of the method for modifying an item of multimedia content and to ensure that the method does not modify a selected portion as soon as the captured item of content is of worse quality than the item of reference content. Indeed, the slightly worsened content present in the selected portion may have a sufficient quality level to allow rendering without modification by the method. This makes it possible for example to limit the consumption of processor time of the method.

According to one variant of this particular embodiment of the invention, the method as described above is characterized in that said at least one threshold value is obtained from a database. This mode of implementation of the invention makes it possible to control the sensitivity of the method. Indeed, the method may retrieve a threshold value before each execution, thus making it possible to modify the selected portion of the item of multimedia content on the basis of the context and the type of content.

The invention also relates to a device for modifying an item of multimedia content captured by a first terminal able to retransmit said item of content, characterized in that the device comprises:
- a module for transmitting/receiving multimedia content,
- a module for identifying at least one portion of said item of content captured by said at least one first terminal,
- a computing module for determining at least one quality indicator for said at least one portion,
- a processing module for modifying said at least one portion of said item of content on the basis of said at least one quality indicator.

The term module may correspond equally to a software component or to a hardware component or to a set of software and hardware components, a software component itself corresponding to one or more computer programs or subroutines or, more generally, to any element of a program able to implement a function or a set of functions such as described for the modules in question. In the same way, a hardware component corresponds to any element of a hardware assembly able to implement a function or a set of functions for the module in question (integrated circuit, chip card, memory card, etc.).

The invention also relates to a terminal or a server comprising a modification device as described above.

The invention also relates to a system for modifying an item of multimedia content captured by a first terminal able to retransmit said item of content, characterized in that the system comprises:
- a first terminal for capturing an item of multimedia content,
- a reception device for receiving the item of multimedia content,
- a device for identifying at least one portion of said item of content,
- a computing device for determining at least one quality indicator for said portion,
- a processing device for modifying said at least one portion of said item of content on the basis of said at least one quality indicator,
- a device for transmitting the modified item of multimedia content,
- a second terminal for receiving and rendering the modified item of content.

The invention also relates to a computer program comprising instructions for implementing the above method according to any one of the particular embodiments described above when said program is executed by a processor. The method may be implemented in various ways, in particular in hard-wired form or in the form of software. This program may use any programming language and be in the form of source code, object code or intermediate code between source code and object code, such as in a partially compiled form, or in any other desirable form.

The invention also targets a computer-readable recording medium or information medium containing instructions of a computer program such as mentioned above. The above-mentioned recording media may be any entity or device capable of storing the program. For example, the medium may comprise a storage means, such as a ROM, for example a CD-ROM or a microelectronic circuit ROM, or else a magnetic recording means, for example a hard disk. Moreover, the recording media may correspond to a transmissible medium such as an electrical or optical signal, which may be routed via an electrical or optical cable, by radio or by other means. The programs according to the invention may in particular be downloaded from an Internet network.

As an alternative, the recording media may correspond to an integrated circuit in which the program is incorporated, the circuit being designed to execute or to be used in the execution of the method in question.

This device and this system for modifying an item of multimedia content, as well as this computer program, have features and advantages that are analogous to those described above in relation to the method for modifying an item of multimedia content.

4. LIST OF THE FIGURES

Figure 2:
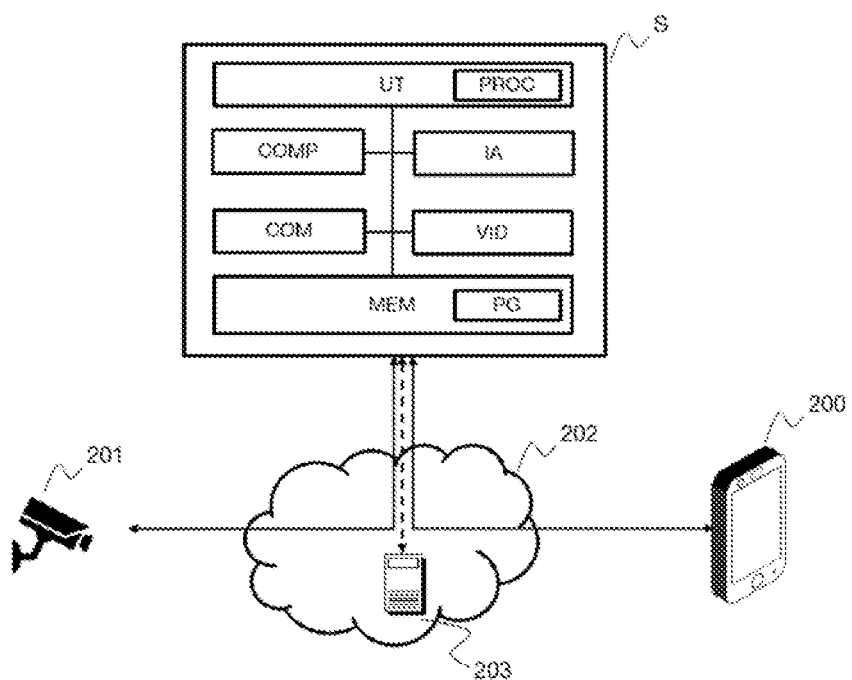
Figure 3:
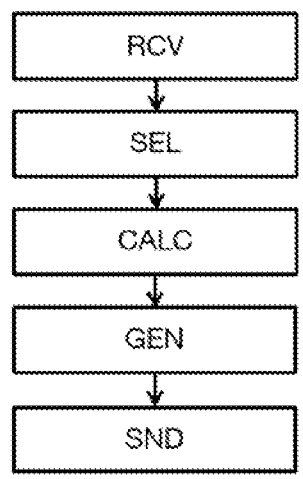

Other features and advantages of the invention will become more clearly apparent upon reading the following description of particular embodiments, provided by way of simple illustrative and nonlimiting examples, and the appended drawings, in which:

FIG. 1 illustrates an example of an implementation environment according to one particular embodiment of the invention, FIG. 2 illustrates the architecture of a system implementing the invention according to one particular embodiment, FIG. 3 illustrates steps of the method for modifying an item of multimedia content according to one particular embodiment of the invention.

5. DESCRIPTION OF ONE EMBODIMENT OF THE INVENTION

5.1 General Principle of the Invention

The method for modifying an item of multimedia content described here allows for example participants in a videoconference to share an item of multimedia content enriched by the method, thus ensuring, as required, an optimum confidentiality level or quality level for shared content.

5.2 Particular Embodiments of the Invention

FIG. 1 illustrates an example of an implementation environment of the invention according to one particular embodiment. The implementation environment comprises at least one first terminal (101) and at least one second terminal (105) that are capable of establishing video communications according to the prior art through a communications network (103). The terminal (101) is for example a connected camera or any other terminal able to capture an image or a sequence of images and to connect to the communication network (103), located for example in a videoconference room (100). The implementation environment also comprises a server (104) that is accessible from the communication network (103) and that will be responsible for executing the method for modifying an item of multimedia content.

The quality of the image or of the sequence of images captured by a first terminal (101) depends, inter alia, on its video acquisition capabilities, such as the resolution of its camera, but also on the quality of the communication network (103). The invention proposes a solution that aims, by virtue of the server (104) and when the conditions require, to modify the item of content captured by a first terminal (101) and then to rebroadcast it to a second terminal (105) so that it is then rendered on its screen (107).

According to one particular embodiment of the invention, the implementation environment also comprises a camera (106) located on a second terminal (105) for capturing and broadcasting an image or a sequence of images to the server (104). The server will then rebroadcast the item of content, processed through the method for modifying an item of multimedia content, to at least one terminal able to render it and located in the videoconference room.

According to one particular embodiment of the invention, the terminal located in the videoconference room may be the first terminal (101).

According to one particular embodiment, the method for modifying an item of multimedia content may be executed on a first or a second terminal.

According to one particular embodiment, the method for modifying an item of multimedia content may be executed in a manner distributed over the first and second terminals.

The first and second terminals may be connected cameras, smartphones, tablets, laptops or any other device capable of establishing video communications, but the invention applies in the same way to audiovisual communication.

FIG. 2 illustrates a device (S) configured so as to implement the method for modifying an item of multimedia content according to one particular embodiment of the invention. The device (S) has the conventional architecture of a computer, and comprises in particular a memory MEM, a processing unit UT, equipped for example with a processor PROC, and driven by the computer program PG stored in memory MEM. The computer program PG comprises instructions for implementing the steps of the method for modifying an item of multimedia content as described further on with reference to FIG. 3 when the program is executed by the processor PROC.

On initialization, the code instructions of the computer program PG are for example loaded into a memory, before being executed by the processor PROC. The processor PROC of the processing unit UT in particular implements the steps of the method for modifying an item of multimedia content according to any one of the particular embodiments described with reference to FIG. 3 and according to the instructions of the computer program PG.

The device (S) comprises a communication module COM configured so as to establish communications with a network, for example an IP network, using Ethernet or Wi-Fi technology. This communication module is for example used to receive an image or a sequence of images captured by a first terminal, such as for example a connected camera (201), and to broadcast, when necessary, a modified version of the image or of the sequence of images to a second terminal (200). This same module may also be called up to download data used by the method for modifying an item of multimedia content from a server (203), such as for example a threshold value of a quality indicator associated with a portion of the item of multimedia content captured by the first terminal. The communication module COM may also intervene in order to evaluate the bandwidth of the communication network (202) so as to have the most accurate possible quality indicator. The first and second terminals will for example download cookies (of a predefined size) that are hosted in the memory (MEM) of the device (S). The bandwidth of the communication network may then be evaluated on the basis of the download times of the cookies.

The device (S) comprises, in addition to the memory (MEM) and the processing unit (UT), an identification module (IA) able to analyze and select a portion of the item of multimedia content captured by a first terminal, such as an artificial intelligence module trained to recognize a certain type of element in an image or sequence of images, such as for example the image of a board or a television.

The device (S) furthermore comprises a computing module (COMP) for determining the quality indicator for the selected portion through comparison with an item of reference content, such as for example an alphabet or a dictionary if the processed portion is an area of text.

According to one particular embodiment, the item of reference content may be an item of content stored in the memory (MEM) of the device.

According to another particular embodiment, the item of reference content may be an item of content accessible from a database located in the network.

The device (S) also comprises a video processing module (VID) able to process and modify an item of multimedia content. This module will for example modify the image or the sequence of images captured by a first terminal in order to enrich it with the high-resolution item of reference content. Once modified, the image or the sequence of images is then returned to a second terminal via the interface COM of the device.

According to another particular embodiment, the modification performed by the module VID may be conditional upon the result of the comparison between a threshold value and a quality indicator determined by the module COMP for the selected portion.

FIG. 3 illustrates steps of the method for modifying an item of multimedia content according to one particular embodiment of the invention. The method runs on the device for modifying an item of multimedia content, which is located for example on a server in the network or on an Internet gateway such as an ADSL or fiber router. In the first step (RCV), the method will establish a connection with a first terminal present in the videoconference room and for example receive the image or the sequence of images captured by the terminal. The method for modifying an item of multimedia content will also, according to this example, obtain the high-definition content that will be presented. Optionally, it furthermore obtains at least one threshold value of at least one quality indicator to be complied with. This step will also make it possible to establish a connection to a second terminal, for example not present in the videoconference room. In other words, the device located in the network on a server will act as a relay between the first and the second terminals. According to one particular embodiment of the invention, the one or more threshold values may be stored in the memory (MEM) of the device. Advantageously, in the event of loss of connectivity with the remote server hosting the threshold values, the method for modifying an item of multimedia content may continue and implement the second step. In the second step (SEL), the method will select at least one portion of the item of multimedia content. This selection may be made for example using artificial intelligence trained to recognize a specific element in an image or a sequence of images. This may be predefined markers or objects, such as an image of a screen or a board. The selection may also be made by searching the item of multimedia content for one of the elements present in the item of reference content, such as for example a QR code, a logo or any other characteristic element of the item of reference content. In the third step (CALC), the method will obtain at least one quality indicator for a portion selected in the phase (SEL). The quality indicator is determined for example by comparing the content of the selected portion and the associated item of reference content. In the case of a textual item of content, the indicator may be determined using a character recognition algorithm (OCR—Optical Character Recognition), the result of which is compared with an alphabet or with a predefined list of words, such as a dictionary stored for example in the memory (MEM) of the device. The number of matches makes it possible to establish a score and thus to define a quality indicator. Previously trained AI may also be used to compare more complex content, such as for example graphics, images or videos. The quality indicator is for example determined in line with the difference observed in terms of shapes, pixelation or even colors. According to one particular embodiment of the invention, the portion selected in the phase (SEL) may be compared with the item of reference content downloaded beforehand and stored in the memory (MEM) of the device in step 1 (RCV).

In the following step (GEN), the method will generate a modified item of multimedia content at the portion selected in step 2 (SEL) on the basis of a quality indicator.

According to one particular embodiment of the invention, the modification made to the selected portion may be the high-definition overlaying of the item of reference content shared and broadcast on the screen of the videoconference room. Indeed, the method will search the item of reference content for the content that corresponds to that of the selected portion. This search may be performed for example using the number of the page of the presentation or any other characteristic element of the displayed item of content, such as an image, a logo or a marker.

According to another particular embodiment of the invention, the modification made to the selected portion may be masking or deformation that renders the item of content unintelligible and makes it possible to ensure that no confidential data will be broadcast.

According to another particular embodiment of the invention, the modification made to the selected portion may be the overlaying of a clickable item of content allowing the user to display the item of reference content in high definition.

In the last step (SND), the method will broadcast the modified item of content to at least one second terminal using the module COM of the device for modifying an item of multimedia content.

The method may be triggered at regular time intervals or upon simple request. The requests may for example be linked to a user action, such as clicking on said at least one portion or else when the analysis of the item of multimedia content indicates that the item of content broadcast by said at least one first terminal has changed significantly. The triggering frequency of said method will also make it possible, if it is high, to synchronize the item of reference content shared and broadcast on the screen of the videoconference room and the item of content modified by said method and broadcast to said at least one second terminal.

It goes without saying that the embodiment that has been described above has been given purely by way of wholly nonlimiting indication, and that numerous modifications may easily be made by those skilled in the art without, however, departing from the scope of the invention.

The invention claimed is:

1. A method for modifying an item of multimedia content captured by at least one first terminal that is able to retransmit said item of content over a communication network, wherein the method is performed by a device and comprises:
   identifying at least one portion of said item of multimedia content captured by said at least one first terminal,
   determining at least one quality indicator for said at least one portion by comparing the content of the at least one portion of said item of multimedia content captured and an obtained item of a reference content, and
   modifying said at least one portion of said item of multimedia content on the basis of said at least one quality indicator.

2. The method as claimed in claim 1, wherein the modifying is followed by transmitting the modified item of multimedia content to at least one second terminal.

3. The method as claimed in claim 1, wherein said portion of the item of multimedia content contains an image or a sequence of images.

4. The method as claimed in claim 3, wherein the modifying of said at least one portion is an enrichment with an image or a sequence of images having said at least one quality indicator, which is higher than the one determined for said at least one portion.

5. The method as claimed in claim 3, wherein the modifying of said at least one portion is an enrichment with an image or a sequence of images having said at least one quality indicator, which is lower than the one determined for said at least one portion.

6. The method as claimed in claim 1, wherein said at least one quality indicator depends on hardware or software capabilities of said at least one first terminal.

7. The method as claimed in claim 1, wherein said at least one quality indicator depends on quality of the communication network that is used.

8. The method as claimed in claim 1, wherein said at least one quality indicator for the content of said at least one portion is compared with at least one predetermined threshold value for the quality.

9. The method as claimed in claim 8, wherein said at least one threshold value is obtained from a database.

10. The method as claimed claim 1, wherein the item of reference content is obtained from a database.

11. A modification device for modifying an item of multimedia content captured by a first terminal that is able to retransmit said item of content, wherein the device comprises:
   a communication module for transmitting/receiving multimedia content,
   at least one processor; and
   at least one non-transitory computer-readable medium comprising instructions stored thereon which when executed by the at least one processor configure the device to:
   identify at least one portion of said item of multimedia content captured by said at least one first terminal,
   determine at least one quality indicator for said at least one portion by comparing the content of the at least one portion of said item of multimedia content captured and an obtained item of a reference content, and
   modify said at least one portion of said item of multimedia content on the basis of said at least one quality indicator.

12. A terminal or server, which comprises the modification device as claimed in claim 11.

13. A system for modifying an item of multimedia content captured by a first terminal that is able to retransmit said item of content, wherein the system comprises:
   the first terminal for capturing an item of multimedia content,
   a modification device, which is configured to:
   receive the item of multimedia content,
   identify at least one portion of said item of multimedia content,
   determine at least one quality indicator for said portion by comparing the content of the at least one portion of said item of multimedia content captured and an obtained item of a reference content, modify said at least one portion of said item of multimedia content on the basis of said at least one quality indicator, and transmit the modified item of multimedia content, and a second terminal for receiving and rendering the modified item of multimedia content.

14. A non-transitory computer-readable medium comprising a computer program stored thereon comprising instructions for implementing method for modifying an item of multimedia content captured by at least one first terminal, when the program is executed by a processor, wherein the first terminal is able to retransmit said item of content over a communication network, and wherein the method comprises:

identifying at least one portion of said item of multimedia content captured by said at least one first terminal, determining at least one quality indicator for said at least one portion by comparing the content of the at least one portion of said item of multimedia content captured and an obtained item of a reference content, and modifying said at least one portion of said item of multimedia content on the basis of said at least one quality indicator.

\* \* \* \* \*